United States Patent [19]
Ackerman et al.

[11] Patent Number: 5,147,616
[45] Date of Patent: Sep. 15, 1992

[54] MAGNESIUM TRANSPORT EXTRACTION OF TRANSURANIUM ELEMENTS FROM LWR FUEL

[75] Inventors: John P. Ackerman, Downers Grove; James E. Battles, Oak Forest; Terry R. Johnson, Wheaton; William E. Miller; R. Dean Pierce, both of Naperville, all of Ill.

[73] Assignee: The United States of America as represented by the United States Department of Energy, Washington, D.C.

[21] Appl. No.: 770,387

[22] Filed: Oct. 3, 1991

[51] Int. Cl.$^5$ ............................................. C22B 60/02
[52] U.S. Cl. ........................................ 423/5; 423/21.1; 423/155; 423/179; 423/22; 423/23; 423/250; 423/251; 423/253; 204/1.5; 252/627; 75/395; 75/397; 75/399
[58] Field of Search ................. 75/397, 399, 395; 252/627; 423/5, 21.1, 250, 251, 253, 23, 22, 155, 179; 204/1.5

[56] References Cited

U.S. PATENT DOCUMENTS

| | | | |
|---|---|---|---|
| 3,011,865 | 12/1961 | Benedict et al. | 423/5 |
| 3,023,097 | 2/1962 | Burris, Jr. et al. | 75/399 |
| 3,030,176 | 4/1962 | Lyon | 423/5 |
| 3,147,109 | 9/1964 | Knighton et al. | 75/397 |
| 3,154,379 | 10/1964 | Benedict et al. | 423/5 |
| 3,282,681 | 11/1966 | Knighton et al. | 75/397 |
| 3,284,190 | 11/1966 | Knighton et al. | 75/399 |
| 3,607,145 | 9/1971 | Wenz | 423/11 |
| 4,814,046 | 3/1989 | Johnson et al. | 204/1.5 |
| 5,041,193 | 8/1991 | Grantham | 204/1.5 |

Primary Examiner—Brooks H. Hunt
Assistant Examiner—Ngoclan T. Mai
Attorney, Agent, or Firm—James W. Weinberger; Thomas G. Anderson; William R. Moser

[57] ABSTRACT

A process of separating transuranium actinide values from uranium values present in spent nuclear oxide fuels which contain rare earth and noble metal fission products. The oxide fuel is reduced with Ca metal in the presence of $CaCl_2$ and a U-Fe alloy containing not less than about 84% by weight uranium at a temperature in the range of from about 800° C. to about 850° C. to produce additional uranium metal which dissolves in the U-Fe alloy raising the uranium concentration and having transuranium actinide metals and rare earth fission product metals and the noble metal fission products dissolved therein. The $CaCl_2$ having CaO and fission products of alkali metals and the alkali earth metals and iodine dissolved therein is separated and electrolytically treated with a carbon electrode to reduce the CaO to Ca metal while converting the carbon electrode to CO and $CO_2$. The Ca metal and $CaCl_2$ is recycled to reduce additional oxide fuel. The U-Fe alloy having transuranium actinide metals and rare earth fission product metals and the noble metal fission products dissolved therein is contacted with Mg metal which takes up the actinide and rare earth fission product metals. The U-Fe alloy retains the noble metal fission products and is stored while the Mg is distilled and recycled leaving the transuranium actinide and rare earth fission products isolated.

20 Claims, 1 Drawing Sheet

MAGNESIUM TRANSPORT EXTRACTION OF TRANSURANIUM ELEMENTS FROM LWR FUEL

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a pyrochemical process for converting spent oxide nuclear fuel from a light water reactor to metal and for separating plutonium and higher actinide metals such as americium, neptium and curium from the bulk uranium. Because the end product is for use in a integrated fast reactor (IFR), high decontamination of the separate streams from fission products is not a prime concern nor is the total separation of plutonium, americium, neptunium and curium (hereinafter transuranic elements) from the bulk uranium. The transuranic or transuranium elements will be used to make core fuel for a liquid metal fast breeder (LMFBR) particularly of the new IFR or integrated fast reactor type. Because of the purpose for which this reprocessed fuel will be used, some uranium can accompany the plutonium stream since the uranium to plutonium ratio in a LMFBR fuel is in the range of 2-3.5:1. The bulk uranium or uranium rich product stream is to be stored for later use, for instance as a uranium source for breeder blankets in a liquid metal fast breeder reactor (LMFBR), when and if such fast reactors are commercially viable. A goal of the process is to remove approximately 90% of the transuranic or transuranium actinides from the uranium so that the transuranic actinides can be used as core fuel and the remaining uranium can be used as blanket material.

Accordingly, it is an object of the invention to provide a process for separating transuranic or transuranium actinide values from spent oxide nuclear fuel while reducing the amount of nuclear waste material which has to be treated and stored.

Another object of the invention is to provide a process using various combinations of alloys, salts and liquid magnesium selectively to separate uranium from the transuranic values present in spent nuclear oxide fuel and to reuse the salts and the magnesium many times in order efficiently to separate the desired values while producing a very small amount of nuclear waste.

A still further object of the invention is to provide a process of separating transuranium actinide values from uranium values present in spent nuclear oxide fuels containing rare earth and noble metal fission products as well as other fission products, comprising reducing the oxide fuel with Ca metal in the presence of Ca halide and a U-Fe alloy which is liquid at about 800° C. to dissolve uranium metal and the noble metal fission products and transuranium actinide metals and rare earth fission product metals leaving Ca halide having CaO and fission products of alkali metals and the alkali earth metals and iodine dissolved therein, separating the Ca halide and CaO and the fission products contained therein from the U-Fe alloy and the metal values dissolved therein, contacting the U-Fe alloy having dissolved therein reduced metals from the spent nuclear fuel with Mg metal to transfer transuranium actinide metals and rare earth metals to the liquid Mg metal leaving the uranium and noble metal fission products in the U-Fe alloy, thereafter separating the Mg and the metals dissolved therein from the U-Fe alloy and the metals dissolved therein, and distilling the Mg from the transuranium actinide and rare earth metals.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWING

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
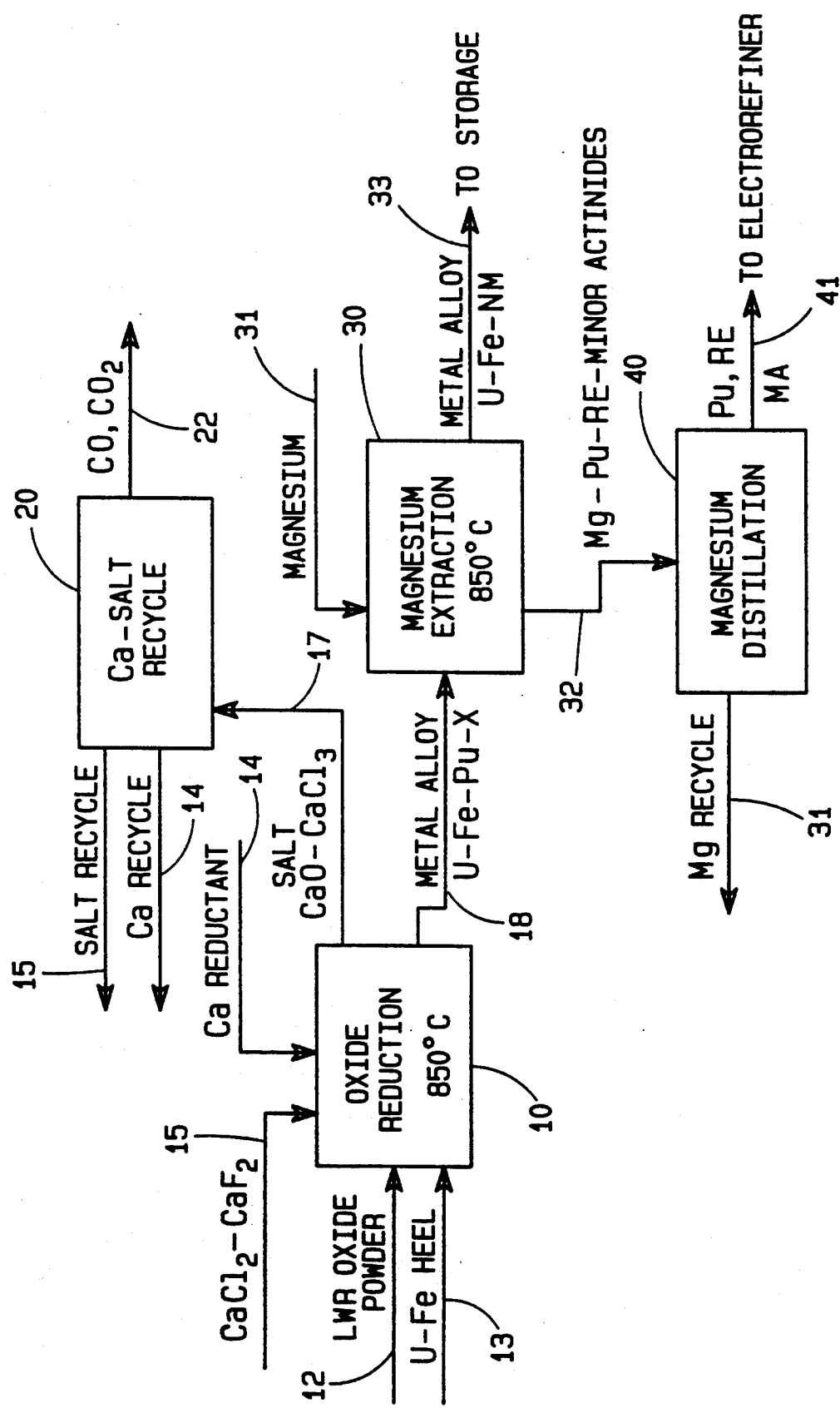
FIG. 1 is a schematic diagram for illustrating the process of the present invention.

The inventive process begins with spent nuclear oxide fuel from a light water reactor which has been mechanically declad such that the product of the decladding is the oxide pellet and/or oxide particulate which is used as a process feed. The process feed is introduced into an oxide reduction vessel 10 and particularly into a crucible in the vessel 10 by means of an inlet line 12. In the vessel 10 is a two-phase system consisting of a uranium-iron liquid alloy introduced through inlet line 13 on top of which are liquid calcium metal introduced through inlet line 14 and a liquid calcium chloride salt introduced through inlet line 15, the entire vessel 10 being maintained at a temperature in the range of from about 750° C. to about 850° C. with the preferred temperature being about 850° C.

Any calcium halide salt or mixture is adequate, providing the melting point is less than about 750° C.; however, $CaCl_2$ should be present as a majority constituent and the preferred salt is 85% by weight $CaCl_2$ with the balance $CaF_2$. As the oxide fuel is introduced into the vessel 10 and mixed by mechanism (not shown), the oxides are reduced by reaction with the liquid calcium metal to form calcium oxide which dissolves in the calcium chloride salt, producing the uranium and transuranic metals along with noble metal fission products. Although uranium has a melting point of about 1150° C. when present in an alloy with Fe, wherein the uranium concentration is in the range of from about 84% by weight to about 96% by weight, the alloy is liquid at 850° C. and where uranium is present in the range of from about 87% by weight to about 94% by weight, the alloy is liquid at 800° C. Alkali metal and alkaline earth metal and iodine fission products which are reduced by the calcium dissolve as chlorides in the calcium chloride salt phase whereas the transuranic actinides including plutonium dissolve in the U-Fe alloy phase along with rare earth fission product metals and the noble metal fission products.

The preferred alloy used in this phase of the separation is a uranium 88% by weight-Fe alloy to which is added uranium from the reduced fuel until uranium is present in an amount of about 93 to 94% by weight. Good reductions of the oxide fuel take place above 750° C., but the higher the temperature, the greater the vapor pressure and more corrosive the reactants. Preferably, the reduction takes place about 850° C. After reduction of the oxide fuel, a three phase system exists within the vessel 10. Uranium-iron alloy and the noble metal fission products and the transuranic actinides along with the rare earth metals are dissolved in the alloy. The salt phase includes the dissolved calcium oxide which is the product of the reduction of the oxide fuel along with the alkali metal and alkaline earth metal and iodine fission products which migrate to the salt as chlorides. After the reduction in vessel 10 is complete, the calcium chloride salt containing dissolved calcium oxide is transported by means (not shown) to a calcium regenerator vessel 20.

The oxide fuel reduction vessel 10 is provided with a top so as to close the vessel 10 during the reduction. The calcium regenerator vessel 20 includes an electrochemical mechanism (not shown) having a carbon electrode 22 connected to a source of electrical power (not shown). A line 17 from the oxide fuel reduction vessel 10 leads to the vessel 20 wherein it receives the calcium chloride salt having the calcium oxide dissolved therein along with the alkali metal and alkaline earth fission product chlorides which have dissolved in the calcium salt during the reduction of the oxide fuel in vessel 10. In order to be certain that all of the calcium is transferred from the vessel 10, a small portion of the uranium-iron actinide-containing alloy is also transferred to the calcium regenerator 20. A calcium-zinc alloy could be used as an alternative to the uranium-iron alloy in order to accumulate the calcium metal produced during operation of the electrochemical mechanism in the vessel 20. The mechanism includes a liquid metal, preferably Zn, cathode and a porous screen surrounding the carbon anode to prevent particulate carbon particles from contaminating the $CaCl_2$ salt.

Upon operation of the electrochemical mechanism in a well known manner, carbon monoxide and carbon dioxide are produced and exit by line 22 as the carbon electrode is consumed while calcium metal is produced during the reduction of calcium oxide at the electrode and recycled to line 14 while the salt is recycled to line 15. The electrochemical method herein uses a molten Zn cathode and a porous screen surrounding the carbon anode to prevent carbon particulates from contaminating the $CaCl_2$-containing salt. The calcium metal produced by the electrolytical process is taken up either in the uranium-iron alloy from the vessel 10 or by the alternative calcium-zinc alloy, into either of which the calcium will dissolve. If a calcium-zinc alloy is used, then the zinc must be retorted from the alloy involving another step. Accordingly, the preferred alloy used to accumulate the calcium metal produced during the destruction of the carbon electrode is the uranium-iron alloy used in the reduction vessel 10.

The liquid metal alloy phase left in the vessel 10 after the calcium chloride salt has been pumped into the calcium regenerator 20 consists of the original U-Fe alloy with additional uranium reduced from the oxide fuel in addition to the transuranium actinides, the noble metals fission products, the rare earth fission products, with only the alkali metal, alkaline earth metals and iodine fission products transferring to the $CaCl_2$-$CaF_2$ salt. The metal alloy from the reduction vessel 10 exits the vessel via an exit line 18 and enters a magnesium extraction vessel 30. The magnesium extraction vessel 30 has a magnesium input line 31 and a magnesium exit line 32. A product line 33 conducts the metal alloy product, as will be explained, to storage or further processing. The magnesium extraction vessel 30 is operated at a temperature of about 800° C. and in it magnesium from the inlet line 31 is intimately mixed with the uranium-iron metal alloy containing, as heretofore stated, the transuranium actinides, the noble metal fission products, the rare earth fission products, all of which are liquid and dissolved in the metal uranium-iron alloy. At this point the uranium content in the uranium-iron alloy is greater than the uranium content in the alloy in vessel 10 prior to the oxide reduction but, it is critical that the uranium does not exceed about 94% by weight of the alloy in order for the alloy to remain liquid at 800° C., the preferred magnesium extraction temperature. In the event that the uranium content increases to about 96% by weight, then the magnesium extraction must take place at a higher temperature, such as 850° C., or additional iron must be added in order to reduce the weight percent of uranium in the alloy. In any event, after mixing, the magnesium takes up the plutonium and other minor actinides along with the rare earth fission product and is separated and pumped, by means not shown, through line 32 to a magnesium distillation apparatus 40. Remaining in the vessel 30 is a uranium-iron alloy containing the noble metal fission products which is generally stored for later use in as blanket material in a breeder reactor.

The magnesium containing the plutonium, rare earth fission products and other actinides is distilled in the apparatus 40 with the magnesium being recycled via line 3 to the magnesium extraction vessel 30, and the plutonium, other actinides and rare earth fission products are pumped through line 41 to an electrorefiner for further processing as core material for an IFR. The magnesium distillation preferably takes place at about 950° C. It is important to understand that when the metal alloy leaves the vessel 10 some uranium-iron alloy remains in the vessel for a new batch of oxide fuel. Fresh iron can be added to return the uranium-iron content to the original concentration of about 88% by weight uranium. It should be understood that the oxide reduction makes use of the eutectic valley which exists for uranium-iron alloys wherein the uranium is present at approximately 90% by weight and the iron is present at about 10% by weight so as to be able to operate the process in the 800° C. to 850° C. range. In this range, the uranium content can vary from 84% by weight to about 96% by weight. As before stated, the reduction reaction takes place better at higher temperatures, with 750° C. being the lowest temperature at which the oxide reduction takes place. On the other hand, with increased temperatures, the vapor pressures of the materials increase and the corrosion rates of the materials increase thereby presenting handling problems so that a trade-off exists between the higher temperatures which are good for the reduction reactions and the lower temperatures needed for easier handling.

An important aspect of the invention is that no additional radioactive waste is created by the separation of the transuranic actinide values as described herein. Because both the calcium salt and the magnesium are reused in this process, little radioactive waste is created by the reprocessing of the exhausted fuel. The uranium-iron noble metal alloy is stored for later use as blanket material and therefore long term storage is not required.

Because the magnesium is continually distilled, and reused for extraction, it is a continuous cycle, producing little, if any, radioactive waste.

The $CaCl_2$-containing salt may be used in up to fifty batches before sufficient quantities of alkali earth metal and alkali metal fission products have accumulated in the salt such that the heat generated exceeds present regulatory limitations for storage of this radioactive material. Accordingly, a significant number of batches of oxide fuel can be processed by this process without using additional calcium chloride salt or contributing to the amount of nuclear waste material which must be safely stored.

As is understood from the explanation herein, the process is essentially a batch process which may be repeated a number of times. The size of each batch cycle is limited to the amount of plutonium which may be concentrated in pure form from each batch. The reduction batch may be larger but the salt transport portion is limited to approximately 3 kilograms of plutonium in any single batch because of criticality considerations. Because the amount of plutonium produced in the oxide fuel, which is about 0.9 weight percent and the 3 kilogram limitation, each batch of oxide fuel from a LWR reactor reprocessed by the inventive process in about 333 kilograms.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process of separating transuranium actinide values from uranium values present in spent nuclear oxide fuels containing rare earth and noble metal fission products as well as fission products of alkali metals, the alkaline earth metals and iodine, comprising reducing the oxide fuel with Ca metal in the presence of Ca halide and a U-Fe alloy which is liquid at about 800° C. to dissolve uranium values and the noble metal fission products and transuranium actinide values and rare earth fission products leaving Ca halide having CaO and fission products of alkali metals and the alkaline earth metals and iodine dissolved therein, separating the Ca halide and CaO and the fission products contained therein from the U-Fe alloy and the metal values dissolved therein, contacting the U-Fe alloy having dissolved therein reduced metals from the spent nuclear fuel with liquid Mg metal to transfer transuranium actinide values and rare earth metals to the liquid Mg metal leaving the uranium and noble metal fission products in the U-Fe alloy, thereafter separating the Mg and the metal dissolved therein from the U-Fe alloy and the metals dissolved therein, and distilling the Mg from the transuranium actinide values and rare earth metals.

2. The process of claim 1, wherein the Ca halide includes $CaCl_2$.

3. The process of claim 1, wherein the Ca halide is a combination of $CaCl_2$ and $CaF_2$ having a melting point less than 750° C.

4. The process of claim 3, wherein the combination of Ca halides is about 85% by weight $CaCl_2$ and the balance $CaF_2$.

5. The process of claim 1, wherein uranium is present in the uranium-Fe alloy in the range of from about 84% by weight to about 96% by weight.

6. The process of claim 1, wherein the uranium is present in the range of from about 87% by weight to about 94% by weight.

7. The process of claim 1, wherein the temperature is maintained at not less than about 750° C.

8. The process of claim 7, wherein the temperature during oxide reduction and during contact with the liquid Mg is maintained in the range of from about 750° C. to about 850° C.

9. The process of claim 7, wherein the reduction of spent nuclear oxide fuel with Ca metal takes place at about 850°.

10. The process of claim 9, wherein the extraction of transuranium actinide values and rare earth metals from the U-Fe alloy to Mg takes place at a temperature of about 800° C.

11. A process of separating transuranium actinide values from uranium values present in spent nuclear oxide fuels containing rare earth and noble metal fission products as well as fission products of alkali metals, the alkaline earth metals an iodine, comprising reducing the oxide fuel with Ca metal in the presence of Ca halide and a U-Fe alloy which is liquid at about 800° C. to dissolve uranium values and the noble metal fission products and transuranium actinide values and rare earth fission product metals leaving Ca halide having CaO and fission products of alkali metals and the alkaline earth metals and iodine dissolved therein, separating the Ca halide with the CaO and the fission products contained therein from the U-Fe alloy and the metal values dissolved therein and electrolytically contacting the calcium salts with a carbon electrode to reduce the CaO and Ca metal while converting the carbon electrode to CO and $CO_2$ and thereafter recycling the Ca metal and Ca halide salt to reduce additional oxide fuel, contacting the liquid U-Fe alloy having dissolved therein reduced metals from the spent nuclear fuel with liquid Mg metal to transfer transuranium actinide values and rare earth metals to the liquid Mg metal leaving the uranium and noble metal fission products in the U-Fe alloy, thereafter separating the liquid Mg and the metals dissolved therein from the U-Fe alloy and the metals dissolved therein, distilling the Mg from the transuranium actinide and rare earth metals, and recontacting the U-Fe alloy with liquid Mg metal a sufficient number of times until not less than about 99% by weight of the transuranium actinide values have been removed from the U-Fe alloy.

12. The process of claim 11, wherein the Ca halide is at least 50% $CaCl_2$.

13. The process of claim 12, wherein the Ca halide is 85% by weight $CaCl_2$ and the balance $CaF_2$.

14. The process of claim 11, wherein uranium is present in the uranium-Fe alloy in the range of from about 84% by weight to about 96% by weight.

15. The process of claim 11, wherein the reduction of spent nuclear oxide fuel with Ca metal takes place at about 850° C., and the extraction of transuranium metals and rare earth metals from the U-Fe alloy to Mg takes place at a temperature at about 800° C.

16. A process of separating transuranium actinide values from uranium values present in spent nuclear oxide fuels containing rare earth and noble metal fission products as well as fission products of alkali metals, alkaline earth metals and iodine, comprising reducing the oxide fuel with Ca metal in the presence of Ca halide containing predominantly $CaCl_2$ and a U-Fe alloy having not less than about 84% by weight uranium which is liquid at about 800° C. to dissolve uranium values and the noble metal fission products and transuranium actinide values and rare earth fission products leaving Ca halide having CaO and fission products of alkali metals and the alkaline earth metals and iodine dissolved therein, separating the Ca halide with the CaO and the fission products contained therein from the U-Fe alloy and the metal values dissolved therein and electrolytically contacting the calcium salts with a carbon electrode to reduce the CaO to Ca metal while converting the carbon electrode to CO and CO2 and thereafter recycling the Ca metal and Ca halide salt to reduce successive batches of spent nuclear oxide fuel, contacting the liquid U-Fe alloy having dissolved therein reduced metals from the spent nuclear fuel with liquid Mg metal to transfer transuranium actinide values and rare earth metals to the liquid Mg metal leaving the uranium and noble metal fission products in the U-Fe alloy, thereafter separating the liquid Mg and the metals dissolved therein from the U-Fe alloy and the metals dissolved therein, distilling the Mg from the transuranium actinide and rare earth metals, recontacting the U-Fe alloy with liquid Mg metal a sufficient number of times until not less than about 99% by weight of the transuranium actinide values have been removed from the U-Fe alloy, and thereafter contacting a portion of the U-Fe alloy with another batch of spent nuclear oxide fuel in the presence of Ca metal and Ca halide salt at a temperature not less than about 800° C.

17. The process of claim 16, wherein the Ca halide salt has a melting point of about 650° F.

18. The process of claim 16, wherein the Ca halide salt is about 85% by weight $CaCl_2$.

19. The process of claim 16, wherein the oxide reduction takes place at about 850° C. and contact with the liquid Mg takes place at about 800° C.

20. The process of claim 16, wherein the U in the U-Fe alloys is present in the range of from about 84% by weight to about 96% by weight.

* * * * *